(12) United States Patent
Mohamed et al.

(10) Patent No.: US 8,425,969 B2
(45) Date of Patent: Apr. 23, 2013

(54) COOKING OIL COMPOSITION WITH ADDITIVE TO REDUCE OIL ABSORPTION

(75) Inventors: Suhaila Mohamed, Selangor (MY); Fatihanim Mohd Nor, Selangor (MY)

(73) Assignee: University Putra Malaysia, Selangor (MY)

( * ) Notice: Subject to any disclaimer, the term of this patent is extended or adjusted under 35 U.S.C. 154(b) by 36 days.

(21) Appl. No.: 12/745,635

(22) PCT Filed: Jul. 9, 2008

(86) PCT No.: PCT/MY2008/000066
§ 371 (c)(1),
(2), (4) Date: Sep. 24, 2010

(87) PCT Pub. No.: WO2009/075558
PCT Pub. Date: Jun. 18, 2009

(65) Prior Publication Data
US 2011/0033601 A1    Feb. 10, 2011

(30) Foreign Application Priority Data
Dec. 11, 2007  (MY) .................................. 20072213

(51) Int. Cl.
*A23L 1/28* (2006.01)
(52) U.S. Cl.
USPC .......................................... 426/601; 426/655
(58) Field of Classification Search .................. 426/601, 426/655
See application file for complete search history.

(56) References Cited

U.S. PATENT DOCUMENTS

| 4,497,838 A | * | 2/1985 | Bonnell ........................ 426/429 |
| 4,738,857 A | * | 4/1988 | Daher et al. .................. 426/106 |
| 5,998,421 A | | 12/1999 | Yokoo et al. |
| 2007/0128212 A1 | | 6/2007 | Sano et al. |

FOREIGN PATENT DOCUMENTS

| GB | 1200450 A | 7/1970 |
| JP | 2007055067 A | 8/2007 |
| WO | 2007041682 A1 | 4/2007 |
| WO | 2007049227 A1 | 5/2007 |

OTHER PUBLICATIONS

Pokorny. Grasas y Aceites. vol. 49, pp. 265-270. 1998.*
Khan et al. Leung's Encyclopedia of Common Natural Ingredients. 2009. p. 478.*
Karin Schwarz, Shu-Wen Huang, J.Bruce German, Bridgitte Tiersch, Jürgen Hartmann, and Edwin N.Frankel. "Activities of Antioxidants Are Affected by Colloidal Properties of Oil-in-Water and Water in Oil Emulsions and Bulk Oils." J. Agric. Food Chem., vol. 48 (2000) :4874-4882.
S. Tamilvanan. "Oil-in-water lipid emulsions : implication for parental and ocular delivering systems." Prog. Lipid Res., vol. 43 (2004) : 489-533.
Shunmugalperumal Tamilvanan, Simon Benita . "The potential of lipid emulsion for ocular delivery of lipophilic drugs." Eur. J. Pharm. Biopharma., vol. 58 (2004) 357-368.

* cited by examiner

*Primary Examiner* — Anthony Weier
(74) *Attorney, Agent, or Firm* — Preston Smirman; Smirman IP Law, PLLC

(57) ABSTRACT

An extract derives from plant parts of Rutaceae plant family to be incorporated into a cooking oil composition for reducing oil adsorption into food fried in the cooking oil composition thereof.

7 Claims, 5 Drawing Sheets

COOKING OIL COMPOSITION WITH ADDITIVE TO REDUCE OIL ABSORPTION

CROSS-REFERENCE TO RELATED APPLICATION

This Utility Patent Application claims the benefit of the filing date Malaysia Application No. PI20072213, filed Dec. 11, 2007, and International Application No. PCT/MY2008/000066, filed on Jul. 9, 2008, both of which are herein incorporated by reference

FIELD OF THE INVENTION

The present invention is an additive which can be incorporated into edible oil composition especially cooking oil to provide therein anti-oxidant effect and reduce oil adsorption into the food prepared. The additive is composed of biophenolics formulated from plant extracts of the Rutaceae family.

BACKGROUND OF THE INVENTION

Many of the antioxidant additives available in the retail market are made up of synthetic chemicals. Plants contain numerous biophenolic compounds which are anti-oxidative due to their redox properties; which allow them to act as reducing agents, hydrogen donor, single oxygen quenchers and metal chelators. There are widespread feeling amongst consumers against synthetic chemical additives in foods and high fat content in fried food. It has been reported that, dietary administration of butylatedhydroxytoluene (BHT) to rats caused fatal haemorrhages in pleural and peritoneal cavities and organs; i.e. epididymis, testes and pancreas. Butylatedhydroxyanisole (BHA) too, exhibited toxic and carcinogenic effects. These antioxidants are allowed for use within legal limits and they are often used in the food industries; due to their effectiveness and low cost.

Moreover, cooking oil tends to be absorbed into the food along the frying process. Oil absorption in fried food may be as high as 50% of the food weight, making them calorie dense and may contribute to obesity. Fried food and flying oil are highly prone to oxidation, hydrolysis and rancidity which reduce their organoleptic properties and may be detrimental to health.

Presently, the use of natural antioxidants is somewhat limited in the industry due to lack of knowledge about their molecular composition, amount of active ingredients in the source material and the availability of relevant toxicity data. Natural antioxidants from food of plant origin are presumed to be safe due to their traditional long history of use in food.

Patent application WO2007049227 discloses an edible oil composition, particularly for use in frying and cooking foods, which has a high stability under thermal stress, with less development of degradation products during frying and cooking and less absorption of these degradation products on the surface of the food. The composition consists of a mixture of vegetable oils characterized by a ratio by weight (R) of monounsaturated fatty acids to polyunsaturated fatty acids in the range from 5 to 8, a percentage by weight of saturated fatty acids (S) in the range from 18 to 22%, and a content of antioxidants in the range from 50 to 500 ppm. Advantageously, these antioxidants are produced by molecular distillation from natural lipid starting materials.

Japanese patent application no. 2007054067 relates to a method for frying a food portion in a mixture produced by mixing at least one kind of oil with chemically-modified starch of an amount effective for lowering the oil absorption and further relates to a fried food portion produced by the method and having decreased oil content and acceptable taste, texture and appearance.

Another world wide patent application, WO2007041682, by Ashourian et al. claims a method of making reduced-fat or fat-free fried food products, and products made according to the methods, in which food pieces are coated with an aqueous adhesion mixture including a protein, and an oil absorption minimizing agent including an edible lipophilic material, where the coating is adhered to the food pieces, in order to provide for food products having the texture, flavor, and other characteristics of conventional full-fat fried food products, as according to a preferred embodiment.

A United Kingdom patent application No. 1200450 also discloses an improved cooking oil or fat composition comprising an essential oil formulation except citrus essential oil reduce the pungent odour without imparting flavour to the oil and fat composition.

SUMMARY OF THE INVENTION

The present invention aims to disclose an additive which can be incorporated into edible oil composition, preferably a cooking oil composition, thus rendering the edible oil composition more resistant upon oxidation under prolong heating and reduce oil absorption in the fried food.

Further object of the present invention is to provide an edible oil composition, which is suitable to be used for frying food because less of the edible oil composition is absorbed into the fried food. Consequently, consumption of the prepared food is less likely to contribute to obesity and other harmful effects on the health of the consumers due to less excessive intake of fat or calorie.

Moreover, the present invention also offers a cooking oil composition which is less wasteful to be employed in food manufacturing. In particular, the cooking oil composition with the additives is more resistance against degradation due to oxidation, thus less volume of the cooking oil is required to fry the same amount of food compared to the normal cooking oil without the additive.

Furthermore, the present invention can be considered as an environmental friendly solution product which is capable of enhancing cooking oil usage efficiency thus reducing the amount of spent oil waste to be discarded.

At least one of the preceding objects is met, in whole or in part, by the present invention, in which one of the embodiment of the present invention includes an extract formulated from but not limited to various parts of Rutaceae plant family to be incorporated into a cooking oil composition for reducing oil adsorption into food fried by the cooking oil composition thereof.

According to another preferred embodiment of the present invention, the plant parts that the extract derived are fruits, leaves, stem, flowers or roots. It is preferably to have these plant parts dried and prepared into small fragments before subjecting for extraction and formulation. Fried food shows decrease in oil absorption by as much as 30% in the presence of this phenolic based additive oil composition. The additive also has antioxidant properties, anti-hypertensive, anti-histamine, anti-spasmodic, antibacterial, anti-hypercholesterol, anti-inflammation and cancer protective properties and produced significant ($P<0.05$) improvement in crispiness, taste and overall quality of the fried products. The additive developed when added to the frying oil at optimum concentration was capable of retarding oxidation in palm olein similar to BHT in tests such as −PV, AV, FFA, and OSI. Sensory evaluation of the fried food, showed significant ($P<0.05$) improvement in crispiness, taste and overall quality during the 5-day frying when the phenolic based additive was used. The additive developed proved to function as a natural fat antioxidant, oil absorption inhibitor with other health promoting properties making the fried food less hazardous to health.

Further embodiment of the cooking oil composition relates to the amount of the additive in the disclosed cooking oil composition which ranges from 0.02 to 0.5% by weight of the total cooking oil composition.

In order to achieve the stated advantages and end results of the present invention, the extract would contain one or more phenolic compounds, preferably three or more, selected from pinene, citronellal, terpinen-4-ol, citronellol, citronellyl acetate, geranial, geranial acetate, neral, carotenoids, tocopherols, tocotrienols, flavonoids, eriocitrin, neoeriocitrin, narirutin, hesperidin, neohesperidin, didymin, lutein, furocoumarins and carbazole.

DETAILED DESCRIPTION OF THE INVENTION

Figure 1:
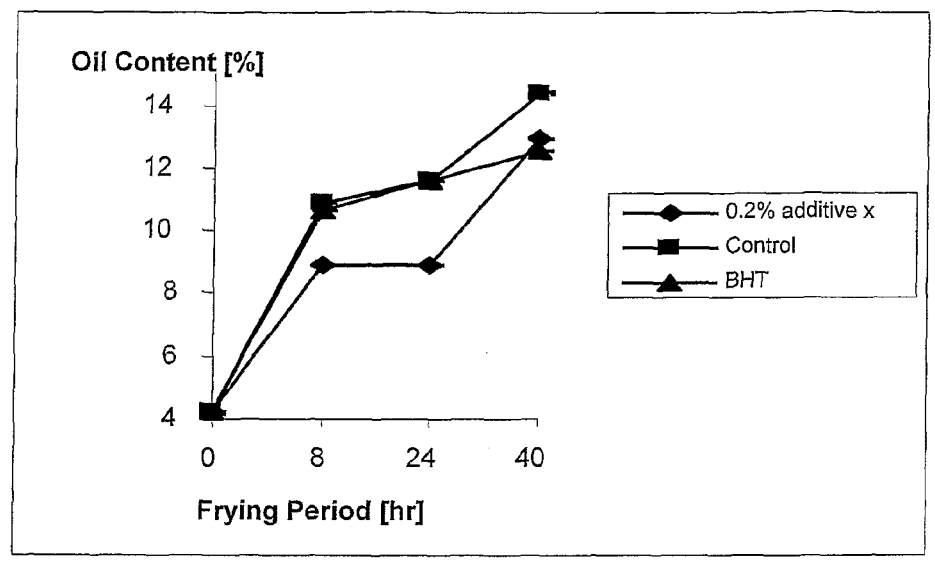
FIG. 1 is a graph showing changes in oil content percentage in French Fries during five days of frying.

One skilled in the art will readily appreciate that the present invention is well adapted to carry out the objects and obtain the ends and advantages mentioned, as well as those inherent therein. The embodiment describes herein is not intended as limitations on the scope of the invention.

One of the embodiment in the present invention is an extract derives from various plant parts of Rutaceae plant family to be incorporated into a cooking oil composition to improve its physiochemical properties. Incorporation of this extract into the cooking oil as an additive not only prolong the shell life of the cooking oil composition, but also increase greatly the cooking oil usage efficiency. In accordance with the preferred embodiment, the extract mentioned herein throughout the specification refers to a bio-phenol based extract. It is patentably important to note that the biophenol based additives is characterized by having oil absorption reducing properties during frying, anti-oxidative, and cardioprotective. The additive developed when added to the frying oil was capable of retarding oxidation in palm olein similar to BHT in tests. The additive developed proved to function as a natural fat antioxidant, oil absorption inhibitor with other health promoting properties providing that consumption of fried food brings less detrimental effect to health. The oil composition with the additives also produces fired food with significant improvement in crispiness, taste and overall quality of fried products. With such properties while having the refreshing flavor, the biophenol based additives and extract derives from the present invention is suitable to prepared food to be consumed by those intended to avoid or alleviate hypertension, hypercholesterol, cancer or degenerative disease risk state. Moreover, the disclosed additives possess refreshing flavour which would enhance if not affect the taste and colour of the edible oil composition nor the food prepared. This can be attributed to the polyphenols and small peptides available in the extracts. Consequently, it is crucial in selecting the right extraction material and process to avoid isolation of unwanted metabolites that may impart unpleasant taste or odour.

Following to further embodiment, the bio-phenol extract is actually isolated from various plant parts such as flowers, leaves and fruits from the plants of Rutaceaea family.

In order to carry out the preferred embodiment of the present invention, the extract to function as the edible oil additive is derived from various plants parts of the Rutaceae family especially of the citrus plants.

Pursuant to the preferred embodiment of the present invention, the additives is most preferred to be prepared in a concentrated form. Optionally, other anti-oxidant agents can be used in conjunction with the extract to acquire an edible oil composition with the desired physiochemical properties for different applications.

Another preferred embodiment of the present invention involves a cooking oil composition comprises an additive having extract derives from plant parts of Rutaceae family. As set forth above, the cooking oil composition mixed with the disclosed additives exhibits excellent anti-oxidative property. Moreover, absorption of the cooking oil composition into the food is reduced significantly too during frying (shown to be 35% less). Though the actual mechanism to attain such low oil absorption into the food prepared is not fully understood, it is probably through its reaction with protein and/or carbohydrates to form an oil barrier at the frying temperatures. The disclosed oil composition also shows significant oil usage efficiency owing to its good anti-oxidative property as further demonstrated by the examples given.

The additive being incorporated into the cooking oil is mainly constituted of extract derives from various plant parts of Rutaceae family such as fruits, leaves, stem, flowers or roots. The amount of the extract in the additives may range from 70% to 100% by mole of the total additive. Like abovementioned, the other anti-oxidative agent can be used in conjunction to formulate this additive.

In order to have the disclosed cooking oil composition possessing the desired physiochemical properties, the concentration of the additives preferably ranges from 0.02 to 0.5 by weight of the total weight of the composition. It is known in the art that insufficient amount of the additives in the cooking oil composition will not render the cooking oil composition with the desired properties, while too much of the additives may affect the colour of the cooking oil composition which does not necessarily adversely affects the oil quality.

One of the preferred embodiments of the disclosed oil composition utilizes the plant parts of the Rutaceae plant selected from the group consisting of citrus plants. Moreover, the plant parts are fruits, leaves and flowers. One skilled in the art shall appreciate the fact that other plants from the Rutaceae family or other plant parts can be used also as the source to acquire the extract, yet the aforesaid plant species and parts contain sufficient preferred bio-polyphenol compounds to produce comparatively high yield. Therefore, any modification thereon shall not depart from the scope of the present invention.

Attention shall now draw to the fact that the bio-phenol based extract from the Rutaceae plant family in the additive preferably contains at least three or more different chemical compounds selected from the group consisting of pinene, citronellal, terpinen-4-ol, citronellol, citronellyl acetate, geranial, geranial acetate, neral, carotenoids, tocopherols, tocotrienols, flavonoids, eriocitrin, neoeriocitrin, narirutin, hesperidin, neohesperidin, didymin, lutein, furocoumarins and carbazole. It is apparent to one skilled in the art to isolate different combination of the abovementioned chemical compounds from the Rutaceae plants family by simply adjustment on the solvent employed for extraction, temperature, pH, time, and so on.

The following part aims to illustrate the extraction process for acquiring the disclosed additive without any intention in limiting the scope of the present invention. The plant parts were collected, cleaned, washed and cut into small pieces and oven dried at 40-50° C. overnight. The dried material was ground using a blender and extracted three times preferably with alcohol (1:10 v/v) and three times with acetone or with mixtures of chloroform and alcohol. Nevertheless, other solvent may be used as the extraction medium to isolate the polar compounds such as polyphenols. This is a process designed to separate soluble phenolic compound by diffusion from a solid matrix (plant tissue) using a liquid matrix (solvent). Alcohol, chloroform, water and acetone has shown to produce good yield in the extraction process. The extraction was repeated few times on the same sample to effectively extract the compounds. The pooled extracts were vacuum-dried at 40° C. and stored until used. One skilled in the art shall appreciate their solubility is susceptible to changes of temperature, and different types of solvents or by using supercritical fluid extraction and may have variation in terms of optimum extraction rate and solubility, thus any modification in terms of changing the extraction temperature to suit the solvents or gas performance shall not depart from the scope of the present invention. Temperatures exceeding 350° C. or so may cause structural destruction of the active components. Likewise, solvents or gas are susceptible to the pH of the extraction environment. The pH of the extraction may be monitored and maintained in the preferable range (pH of 2 to 10) throughout the extraction in consideration of the accumulated polyphenols or small peptides may affect the pH of the extraction thus lead to reduced extraction rate or hydrolysis. To improve the yield and rate of extraction process, the extraction mixture is preferably stirred constantly throughout the whole process so that extraction can occur homogeneously. Common available approaches to remove the solvents mainly depend on temperature and vacuum pressure of the solvents or gas by applying heat or render vacuum for sufficient time.

The following example is intended to further illustrate the invention, without any intent for the invention to be limited to the specific embodiments described therein.

EXAMPLE 1

Biophenol sources mainly from the Rutaceae family were collected, cleaned, washed and cut into small pieces and oven dried at 40-50° C. overnight. The dried material was ground using a blender and extracted three times with alcohol (1:10 v/v) and three times with acetone or with mixtures of chloroform and alcohol. Other solvent may be used as a medium for the polyphenols extraction. This is a process designed to separate soluble phenolic compound by diffusion from a solid matrix (plant tissue) using a liquid matrix (solvent). Alcohol, chloroform and acetone has produced good yield in extracting flavones, flavonols, and catechin. The extraction was done a few times. The pooled extracts were vacuum-dried at 40° C. and stored until used.

EXAMPLE 2

The oil absorption reducing properties for fried food of the biophenol additives and biophenol extract are described below Deep frying experiments were carried out simultaneously using stainless steel electrical open fryer (Frymaster brand, model H14-2SC) with split pot of 11.5 kg capacity (for each pot) and equipped with an autolift stainless steel basket and automatic portable filter system. Three treatments were conducted namely palm olein containing 0.2% Biophenol based additives, palm olein containing 0.02% BHT and palm olein without any additive was used as a control.

Oil (10 kg) was introduced into separate flyers, and heated up to 60° C. before adding 0.2% of extract. The oil was stirred to ensure that it completely dissolved in the media. Approximately 400 g oil samples were collected from each fryer to represent sample for day 0 before oxidation. The remaining oil was heated at 180±2° C. and was allowed to equilibrate at this temperature for 30 min. About 14 batches @ 200 g per batch of French fries were fried for 2.5 min per day at 30 min intervals for 8 hours daily.

The fryers were turned off at the end of the frying experiment each day and the oil was allowed to cool to 60° C. The oil in each fryer was filtered to remove debris using separate filters. Accurately weighed 400 g of the frying oil from each flyer were sampled into amber bottles. All oil samples were spurge with slow bubbles of nitrogen from the bottom of the bottles and stored in a freezer at −20° C. for physical and chemical analysis.

After frying, the French fries were removed from the fryer. Sensory evaluation was conducted on the same day using the $5^{th}$ and $6^{th}$ batches of fried French fries. The fryers were topped up to 10 kg with fresh oils containing antioxidants (0.02% BHT or 0.2% extract) depending on the oil loss. The whole procedure was repeated consecutively for 5 days.

The initial fat content of the frozen French fries before frying was found to be around 4.20%. FIG. 1 shows that the Biophenol based additives was capable of lowering oil absorption by the French fries significantly P<0.05). BHT was not significantly different from control at the $40^{th}$ hours of flying period. Frying oil transfer heat energy from the heat source to the surface of the fried food, immersed in the fat. Moisture escapes and evaporates as steam as food makes contact with the hot frying oil. A portion of the oil is absorbed by the food as the moisture leaves, causing the fat content of the fried product after frying to be four to five times the original fat content.

EXAMPLE 3

The antioxidant properties of biophenol additives and biophenol extract are described below.

Analysis of Oil Quality

Peroxide value, anisidine value, iodine value, free fatty acid, Oxidative Stability Index (OSI), oil content, polar, polymer and colour test was analysed based on The American Oil Chemists' Society Official Methods. Determination of French fries colour was done using Colorimeter.

Figure 2:
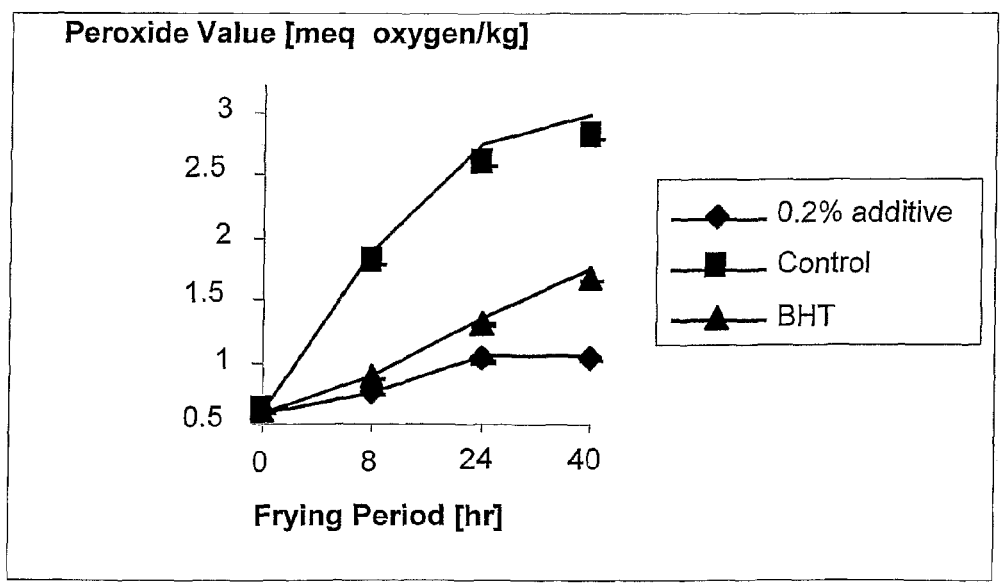
FIG. 2 is a graph showing changes in peroxide value (PV) over time in RBD palm olein.

Peroxide value is the indicator for primary oxidation products in fats and oils. FIG. 2 shows that the Biophenol based additives could significantly (P<0.05) reduce the peroxide value during frying. Peroxide value for sample treated with the extract and BHT were significantly different (P<0.05) after 8 hours of frying. Lower peroxide value in oil samples treated with the Biophenol based additives and BHT indicated their capability in retarding oxidation during frying.

Figure 3:
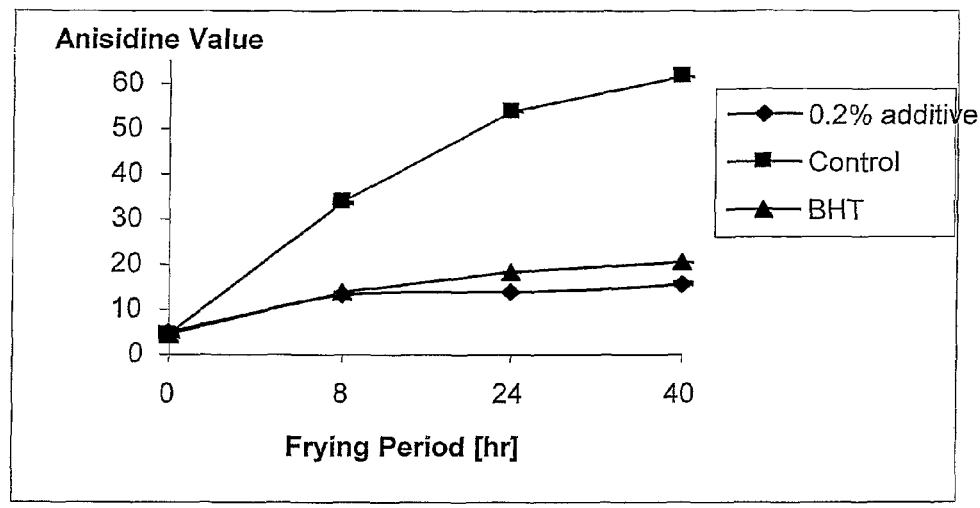
FIG. 3 is a graph showing changes in anisidine value (AV) over time in RBD palm olein.

Anisidine value is the measure of secondary product formation in oil oxidation. FIG. 3 shows that the Biophenol based additives was capable of lowering the anisidine value significantly (P<0.05) compared to BHT after 24 hours of frying. The anisidine value for palm oil treated with the Biophenol additives from 8 to 24 hours was almost constant, which indicated that this additive was capable of stabilizing the peroxides formed in the primary oxidation from further oxidation.

Figure 4:
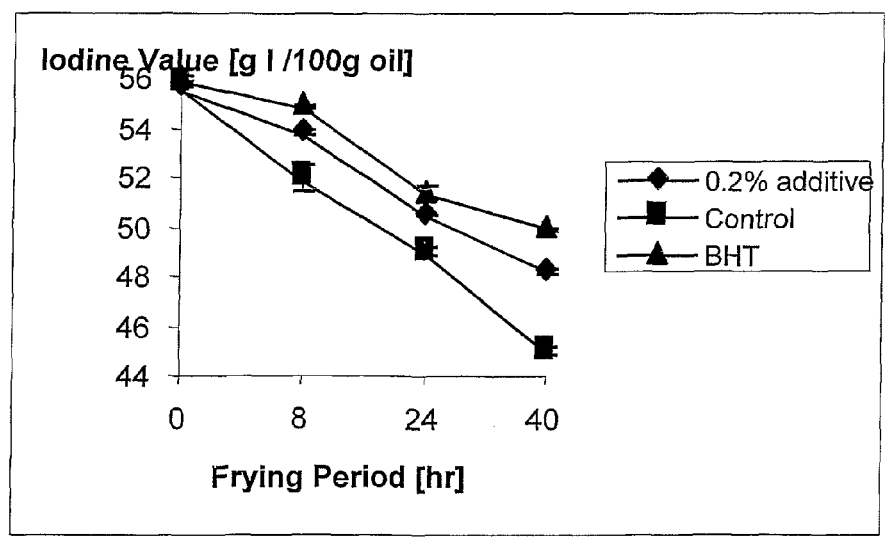
FIG. 4 is a graph showing changes in iodine value (IV) over time in RBD palm olein.

Iodine value represents the degree of unsaturation of fats and oil. In this research, the type of oil used was IV 56, which is normally used in domestic frying. FIG. 4 shows that both natural and synthetic antioxidant were capable of protecting the oil from further oxidation significantly (P<0.05), with better protection exhibited by BHT. When the iodine value decrease significantly (P<0.05) during frying it indicates extensive deterioration of the oil.

Figure 5:
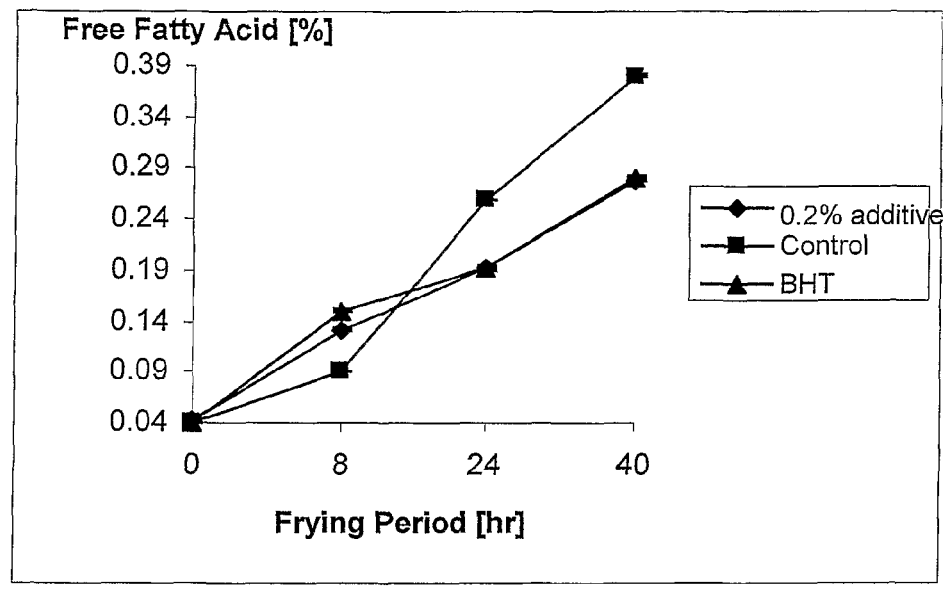
FIG. 5 is a graph showing changes in free fatty acid (FFA) over time in RBD palm olein.

Free fatty acid indicates the hydrolysis of fats and oils during exposure to high temperature. FIG. 5 shows that 0.2% additive formulation and BHT were capable of lowering free fatty acid formation during frying significantly (P<0.05) compared to the control, between 24 to 40 hours. The introduction of moist fries into the flying system accelerated hydrolysis. The free fatty acid values were still below 0.5%, which is the value normally used by the snack food producers to discard the oil.

Figure 6:
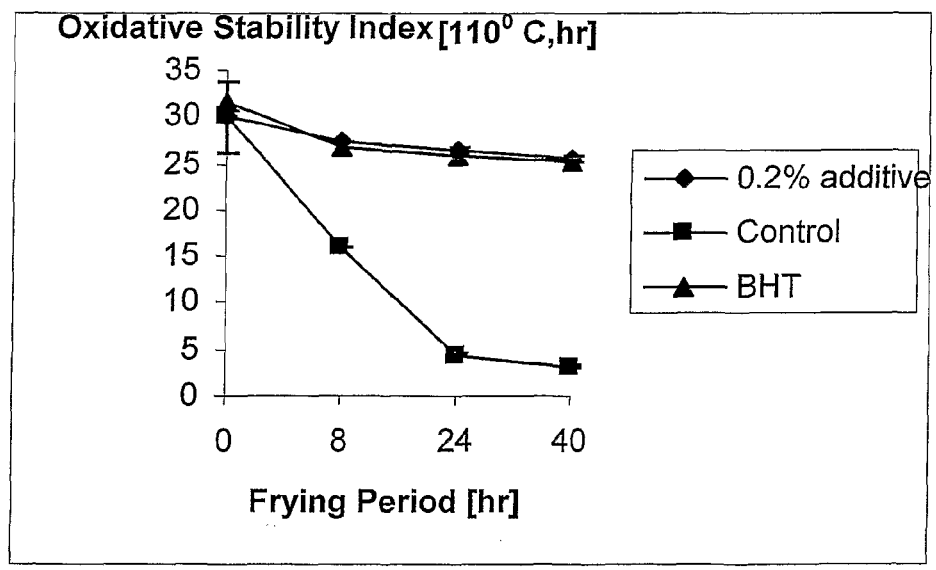
FIG. 6 is a graph showing changes in OSI value over time in RBD palm olein.

Oxidation is initially slow, which later accelerated and became very rapid. The length of time for reaching rapid acceleration of oxidation is used as a measurement for the oil resistance to oxidation, which is commonly referred as the 'induction period or Oxidative Stability Index (OSI) (Anonymous, 2006). FIG. 6 shows that 0.2% additive formulation and BHT could significantly (P<0.05) prolong the shelf life of the cooking oil compared to control. OSI for oil treated with both natural and synthetic antioxidant decreased slightly from 8 to 40 hours of frying period. This might be due to topping up effect of the oil and antioxidant before frying.

Figure 7:
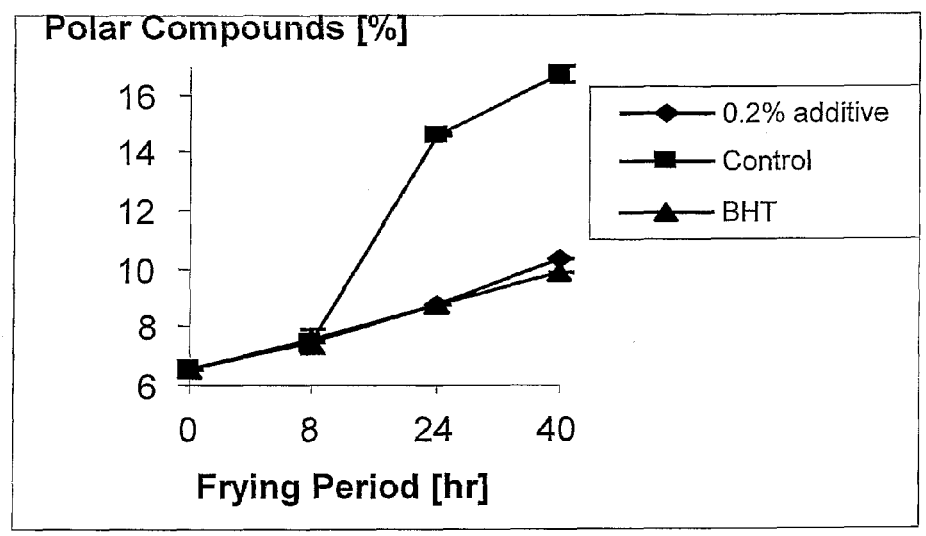
FIG. 7 is a graph showing changes in polar compounds over time in RBD palm olein.

Polar compound represents the non-volatile products that are formed during fats and oil oxidation. FIG. 7 shows that both synthetic and natural antioxidants were capable of lowering polar compounds formation significantly (P<0.05) from day 3 to day 5 compared to the control. On day 5, the Biophenol based additives showed better effect than BHT, indicating that it has better protective effects towards palm olein at high temperature.

Figure 8:
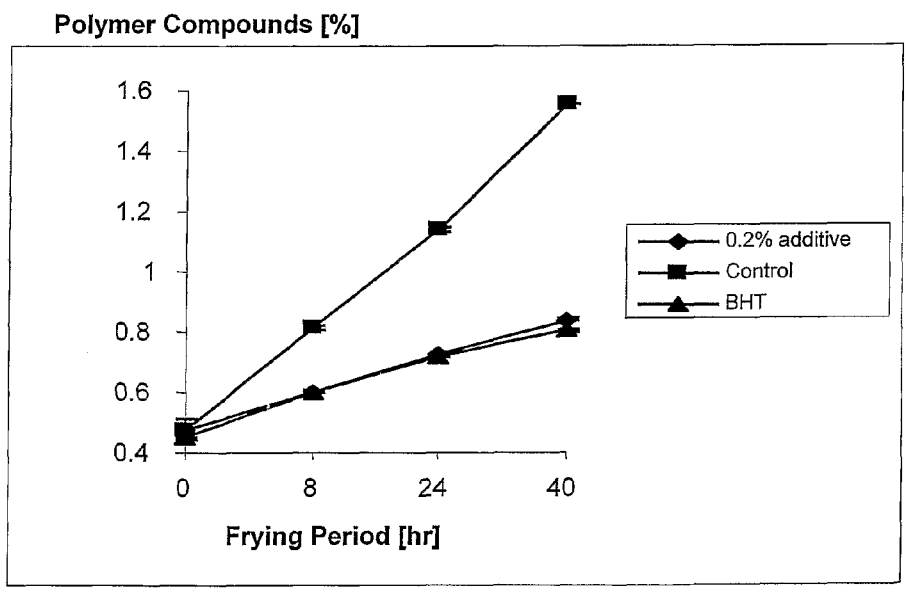
FIG. 8 is a graph showing changes in polymer compounds over time in RBD palm olein.

Triglycerides in dimeric, trimeric and polymeric form are commonly referred to as polymer compounds. the Biophenol additives was found to decrease the formation of polymer compounds significantly (P<0.05), comparable to BHT (FIG. 8). The lower value of the samples treated with the antioxidants (both natural and synthetic) compared to the control sample could be caused by the ability of the antioxidants to retard deterioration of the oils during frying. In this study, the polymeric compounds percentage for all samples were far below the regulated limits of 10-12%.

Colour Analysis

Figure 9:
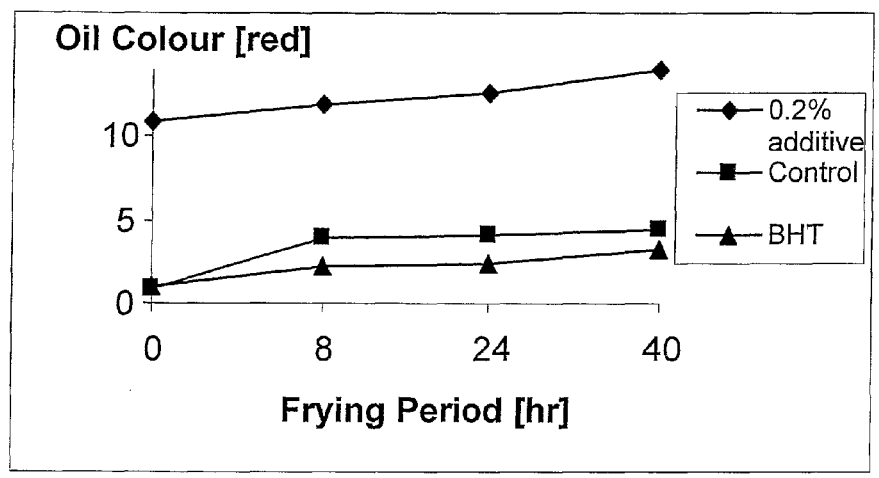
FIG. 9 is a graph showing changes in colour redness over time in RBD palm olein.
Figure 10:
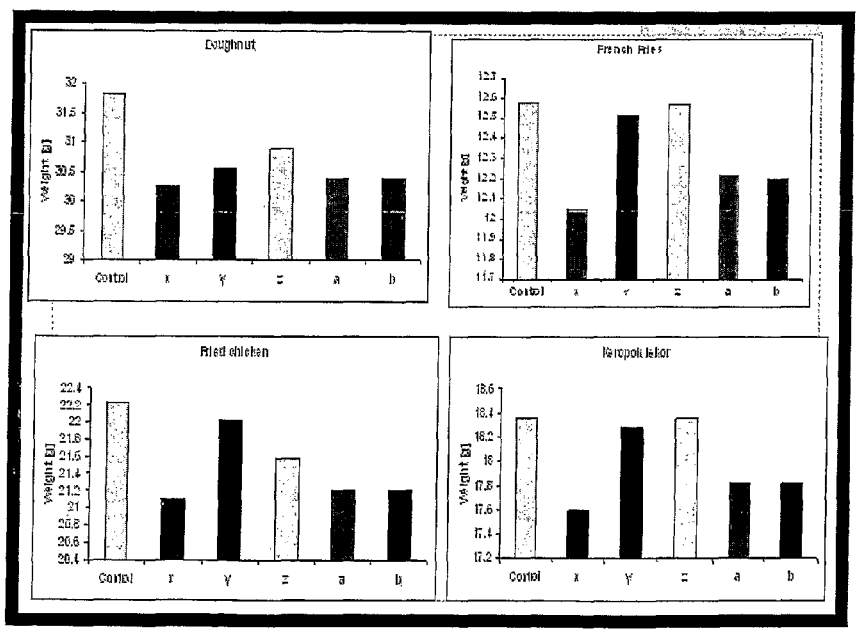
FIG. 10 is a graph showing different additive formulations giving rise to different % of oil absorption by various deep fried food in RBD palm olein (Effect of different phenolic based additives formulation developed on oil absorption of different fried foods).

FIG. 9 shows colour changes in oil during the 5 days of frying. The redness of oil was found to increase significantly (P<0.05) faster in palm olein containing the Biophenol based additives compared to BHT and control as the day increased. Oil containing BHT has significantly (P<0.05) lower redness intensity compared to the control from day 1 to day 5. The Biophenol based additives contains natural pigments, chlorophylls and carotenoids, which may explain the dark colour formation. Oil samples containing the additive were significantly darker than control.

Although, the colour of oil increases significantly during frying, addition of the Biophenol additives into palm olein however did not change the colour of the French fries significantly (P<0.05). The colour tends to be insignificantly darker when compared to control and BHT (Table 1). French fries treated with the Biophenol additives become darker significantly (P<0.05) on day 5. Samples treated with BHT darkened significantly (P<0.05) as the day increased, while French fries for control went through discolouration significantly (P<0.05) as the day increased.

TABLE 1

| | Fries colour | | |
|---|---|---|---|
| | L | $a^a$ | $b^b$ |
| 0.2% additive 8 hr | 66.83 ± 1.00 | −0.88 ± 0.16 | 23.94 ± 0.70 |
| 0.2% additive 24 hr | 67.45 ± 0.27 | −1.29 ± 0.16 | 26.36 ± 1.18 |
| 0.2% additive 40 hr | 68.53 ± 0.09 | −1.87 ± 0.16 | 23.48 ± 1.51 |
| Control 8 hr | 61.55 ± 0.93 | −0.448 ± 0.16 | 16.16 ± 0.36 |
| Control 24 hr | 60.67 ± 1.43 | 0.76 ± 0.19 | 12.92 ± 1.12 |
| Control 40 hr | 58.08 ± 0.68 | 1.00 ± 0.08 | 13.80 ± 0.49 |
| BHT 8 hr | 57.22 ± 1.29 | −0.52 ± 0.16 | 17.49 ± 1.67 |
| BHT 24 hr | 62.22 ± 2.41 | 0.69 ± 0.16 | 18.58 ± 1.96 |
| BHT 40 hr | 66.49 ± 0.33 | 0.75 ± 0.01 | 15.62 ± 0.31 |

[a] +a means red direction, −a means green direction

[b] +b means yellow direction, −b means blue direction

EXAMPLE 4

Sensory Evaluation

Sensory attributes of fried French fries including colour, flavour, oiliness, crispiness, taste and overall quality were evaluated using a 9-point hedonic scale where 1=very poor and 9=very good. 10 trained panellists conducted the sensory evaluation on day 1, 3 and 5.

Table 2 represents sensory evaluation score on day 1, 3 and 5 for French fries treated with synthetic and natural antioxidants. There was no significant difference (P<0.05) in scores for oiliness, crispiness and taste observed between samples during the frying experiment. Evaluation on colour of French fries shows that 0.2% additive and control sample was not significantly different (P<0.05) from one another during the 5-day frying. BHT showed slight decrease in score as the day of frying increased. Flavour score for all samples was not affected by increased frying duration. However, it was observed that the sample was slightly different from one another on day 5. For overall quality, sample treated with the Biophenol based additives was capable of maintaining its score as there was no significant difference (P<0.05) in the score observed when the frying duration increased. It is not the same for control and BHT, where the score decreased significantly (P<0.05) with the frying time. All samples were acceptable up to day 5.

TABLE 2

Effect of 0.2% additive and BHT on sensory acceptability of French fries during deep-fat frying

| Sensory characteristic | Day | 0.2% additive | Control | BHT |
|---|---|---|---|---|
| Colour | 1 | 7.66 ± 0.57Aa | 8.00 ± 0.00Aa | 8.00 ± 0.00Aa |
| | 3 | 7.00 ± 0.00Aa | 6.66 ± 1.15Aa | 7.66 ± 0.57ABa |
| | 5 | 7.66 ± 1.15Aa | 6.33 ± 0.57Aa | 6.00 ± 0.00Ba |
| Flavour | 1 | 7.66 ± 1.15Aa | 8.00 ± 0.00Aa | 7.00 ± 0.00Aa |
| | 3 | 7.33 ± 1.52Aa | 6.66 ± 1.15Aa | 7.00 ± 0.00Aa |
| | 5 | 7.66 ± 1.15Aa | 6.33 ± 0.57Aab | 5.33 ± 0.57Ab |
| Oiliness | 1 | 7.00 ± 2.00Aa | 6.33 ± 0.57Aa | 7.00 ± 1.00Aa |
| | 3 | 5.00 ± 1.73Aa | 7.00 ± 0.00Aa | 6.00 ± 1.00Aa |
| | 5 | 7.00 ± 2.00Aa | 5.33 ± 0.57Aa | 4.33 ± 0.57Aa |
| Crispiness | 1 | 6.66 ± 1.52Aa | 5.66 ± 1.15Aa | 7.66 ± 1.15Aa |
| | 3 | 5.67 ± 3.21Aa | 6.33 ± 1.52Aa | 6.33 ± 1.15Aa |
| | 5 | 6.33 ± 1.52Aa | 5.33 ± 0.57Aa | 4.66 ± 0.57Aa |
| Taste | 1 | 7.33 ± 0.57Aa | 7.66 ± 0.57Aa | 7.66 ± 0.57Aa |
| | 3 | 6.67 ± 2.52Aa | 7.00 ± 1.00Aa | 7.00 ± 1.00Aa |
| | 5 | 7.33 ± 1.52Aa | 6.00 ± 0.00Aa | 5.33 ± 0.57Aa |
| Overall Quality | 1 | 7.66 ± 1.15Aa | 8.00 ± 0.00Aa | 7.00 ± 1.00Aa |
| | 3 | 5.66 ± 1.52Aa | 7.00 ± 1.00ABa | 7.00 ± 1.00Aa |
| | 5 | 7.00 ± 1.00Aa | 5.66 ± 0.57Ba | 4.66 ± 0.57Bb |

$^a$a-b, Means within a row with different letters are significantly different (P < 0.05)
$^b$A-B, Means within a column with different letters are significantly different (P < 0.05)
$^c$Using a 9-point hedonic scale (1 = very poor and 9 = very good)
$^d$Mean of 10 trained panelists Natural antioxidants have been proven to be capable of retarding oxidation in flying. The good activity of the Biophenol based additives in lowering oil oxidation in most tests was due to two reasons; the topping up effect of oil and antioxidants and also compounds that exists in 0.2% additive formulation. 0.2% additive formulation contains among others, coumarins, and bioflavonoids, which can participate in hydrogen donating, radical scavenging and metal chelating activities. Hesperidin in particular, acts as antioxidants even in in-vitro studies, contributes to the integrity of blood vessels, and helps reduces cholesterol, decreased blood pressure in rats and has anti-inflammatory effects. In addition, 0.2% additive formulation contains carotenoids, tocopherols and tocotrienols, which are all beneficial to health.

It is to be understood that the present invention may be embodied in other specific forms and is not limited to the sole embodiment described above. However modification and equivalents of the disclosed concepts such as those which readily occur to one skilled in the art are intended to be included within the scope of the claims which are appended thereto.

The invention claimed is:

1. A cooking oil composition including an additive, the cooking oil composition having been subjected to frying temperatures, the additive comprising a biophenol-based extract derived from plant parts of a Rutaceae plant family, wherein the extract is present in an amount sufficient to reduce oil absorption into food fried in the cooking oil composition, wherein the biophenol-based extract is produced by extracting the plant parts using a solvent extraction medium selected from the group consisting of water, alcohol, acetone, a mixture of alcohol and chloroform, and combinations thereof, wherein the extract contains three or more chemical compounds selected from the group consisting of pinene, citronellal, terpinen-4-ol, citronellol, citronellyl acetate, geranial, geranial acetate, neral, carotenoids, tocopherols, tocotrienols, flavonoids, eriocitrin, neoeriocitrin, narirutin, hesperidin, neohesperidin, didymin, lutein, furocoumarins, carbazole, and combinations thereof.

2. The cooking oil composition according to claim 1, wherein the plant parts are fruits, leaves, stem, flowers or roots.

3. The cooking oil composition according to claim 1, wherein the Rutaceae plant is a Citrus plant.

4. A cooking oil composition including an additive, the cooking oil composition having been subjected to frying temperatures, the additive comprising a biophenol-based extract derived from plant parts of a Rutaceae plant family, wherein the extract is present in an amount sufficient to reduce oil absorption into food fried in the cooking oil composition, wherein the biophenol-based extract is produced by extracting the plant parts using a solvent extraction medium, wherein the extract contains three or more chemical compounds selected from the group consisting of pinene, citronellal, terpinen-4-ol, citronellol, citronellyl acetate, geranial, geranial acetate, neral, carotenoids, tocopherols, tocotrienols, flavonoids, eriocitrin, neoeriocitrin, narirutin, hesperidin, neohesperidin, didymin, lutein, furocoumarins, carbazole, and combinations thereof.

5. The composition according to claim 4, wherein the additive is present in a concentration in the range of 0.02% to 0.5%.

6. The composition according to claim 4, wherein the plant parts are fruits, leaves or flowers.

7. The composition according to claim 4, wherein the Rutaceae plant is a Citrus plant.

\* \* \* \* \*